United States Patent [19]
Solton et al.

[11] Patent Number: 5,493,728
[45] Date of Patent: Feb. 20, 1996

[54] SYSTEM AND METHODS FOR OPTIMIZED ACCESS IN A MULTI-USER ENVIRONMENT

[75] Inventors: Randolph T. Solton, Berkeley; Raymond S. Kiuchi, Santa Cruz, both of Calif.

[73] Assignee: Borland International, Inc., Scotts Valley, Calif.

[21] Appl. No.: 96,796

[22] Filed: Jul. 23, 1993

Related U.S. Application Data

[63] Continuation-in-part of Ser. No. 19,799, Feb. 19, 1993.

[51] Int. Cl.$^6$ .......................................................... G06F 9/00
[52] U.S. Cl. ........................... 395/250; 364/DIG. 1; 364/DIG. 2; 395/483
[58] Field of Search .................................... 395/600, 425, 395/400, 250; 364/246.91

[56] References Cited

U.S. PATENT DOCUMENTS

| | | | |
|---|---|---|---|
| 4,594,656 | 6/1986 | Moffett | 395/425 |
| 4,714,996 | 12/1987 | Gladney et al. | 395/600 |
| 4,887,204 | 12/1989 | Johnson et al. | 364/283.1 |
| 4,897,781 | 11/1990 | Chang et al. | 364/222.81 |
| 5,113,519 | 5/1992 | Johnson et al. | 395/600 |
| 5,133,075 | 7/1992 | Risch | 395/800 |
| 5,151,989 | 9/1992 | Johnson et al. | 395/600 |
| 5,265,235 | 11/1993 | Sindhu et al. | 395/425 |

FOREIGN PATENT DOCUMENTS

WO91/03024  3/1991  WIPO .

OTHER PUBLICATIONS

Updating Software and Configuration Data in A Distributed Communications Network by Carl W. Symborski, IEEE 1988 publication, pp. 331–338.

*Primary Examiner*—William M. Treat
*Assistant Examiner*—Zarni Maung
*Attorney, Agent, or Firm*—John A. Smart; Vernon A. Norviel; Michael J. Ritter

[57] ABSTRACT

A system of the present invention includes a server connected to one or more workstations or "clients" through a computer network. Methods are provided whereby network data access operations, such as are common in shared data processing, are minimized to only those which are necessary for system operation. In all other instances (i.e., time periods when updating is not needed), a workstation may gain access to the data from a local copy stored in a local buffer, preferably a rapid-access memory of the client. At periodic intervals, a workstation is interrupted for marking its local copy of the data as "invalid"—that is, the copy may be inconsistent with a corresponding version stored on the server. With the next access to the data, the local copy is updated from the version resident on the server. Additional optimization may be added for determining whether the server version has been "touched" (i.e., changed) since last transferred to the local buffer, with the local copy being updated only when such a change has been detected. By maintaining data locally, the penalty incurred with frequent, large data transfers across a network connection is avoided.

23 Claims, 8 Drawing Sheets

SYSTEM AND METHODS FOR OPTIMIZED ACCESS IN A MULTI-USER ENVIRONMENT

The present application is a continuation-in-part of application Ser. No. 08/019,799, filed Feb. 19, 1993, the disclosure of which is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to data processing environments and, more particularly, to systems for accessing shared information and other resources, such as in a multi-user database system.

Computers are a powerful tool for the acquisition and processing of information. Computerized databases, which can be regarded as a kind of electronic filing cabinet or repository for collecting computerized data files, are particularly adept at processing vast amounts of information. As such, these systems serve to maintain information in database files or tables and make that information available on demand.

Between the actual physical database itself (i.e., the data actually stored on a storage device) and the users of the system, a database management system or DBMS is provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., An Introduction to Database Systems, Volume I and II, Addison Wesley, 1990; the disclosure of which is hereby incorporated by reference.

Of particular interest to the present invention are those information processing systems which are operative in a shared fashion, i.e., by multiple users (or multiple processes) at a given time. A multi-user database implemented on a client/server platform is one such system. Typically, information sharing or connectivity between the users is provided by a computer network, which comprises several computers connected together as a group. At least one of the computers functions as a "server," providing network services to "clients" (other computers) connected to the network. In this manner, valuable information and resources, including programs, information tables, memory, disk space, printers, and the like, may be shared by several users.

In a multi-user environment, availability of current information to each user is an important consideration. To achieve this, these systems store data objects to be shared (e.g., records of a database file) at a single (logical) location, typically resident on the server. Each user receives access to this centrally-stored information by commanding processes which issue requests to the server for retrieving information of interest. Once received at the client computer, this information may be modified by the client's user and then posted back to the server.

Inherent in any multi-user computing system is a basic conflict between data integrity and concurrency, i.e., the need to let many users access the same data simultaneously. Specifically, the potential exists for one user to update a record thereby causing another user to now have an out-of-date version of that same record (i.e., a local copy of the record which does not reflect the update). Suppose, for example, that two users are both executing an application that reads a particular value from a database, performs a calculation on the value, and writes a new value back to the database. If this process begins concurrently, both users will read the same database value, e.g., three. Suppose the calculation is to increment the database value by one. After both users have finished, the new value stored in the database will be four. However, the correct value desired is five, since each of the two is intended to add one to the value of three. The concurrent actions of the two processes have interfered, thus leaving incorrect data in the database. Further safeguards are needed to avoid inconsistent versions of information records.

As one approach to ensuring data integrity, a system could allow only one user to use a particular data record at any given time. As this would be highly inconvenient to other users, it is an unacceptable approach. At the other extreme, the system could allow anyone on a network to use any record at any time. Such unrestricted access, however, would quickly lead to inconsistencies in the data, such as in the example above. Since the need for insuring data integrity must be balanced with the need to provide concurrent access, an important issue in designing any multi-user application therefore is deciding how to resolve simultaneous requests for the same data. And the need for concurrency control is perhaps most acute in a multi-user database system, where information is frequently or even constantly being updated by several users.

The most common mechanism employed for coordinating processes and controlling access to shared data objects is "locking." In its simplest form, locking an object, such as a database record, prevents other processes or transactions from accessing that object (or portion thereof) until the lock is released. This prevents one user or process from updating a data object which is currently being used by another.

An additional benefit is available to the holder of a lock. Since the lock guarantees that the information will not change (i.e., be modified by others), the lock holder may cache the accessed information in a local buffer, thereby avoiding repeated data access across notoriously slow computer networks. In typical data access operation, for instance, numerous messages must be transmitted between a server and its often numerous clients. For example, messages are required for file operation (e.g., opening, reading, writing, closing, and the like) as well as lock management (e.g., set lock and release lock). With a lock in place for an object, however, the information of interest can be stored locally (cached) by the lock holder, since the lock guarantees that the object will not be changed by others.

Of course the touchstone of a multi-user environment is sharing. No one user or process can be given access to a given object for long periods of time to the exclusion of others. A lock must, therefore, be held for short periods of time, or at least be relinquished when others require access. The ability to cache data locally is therefore limited by the need of others to access the same information.

If this need to share a particular object is not great, however, then a lock may be applied to the object, and a copy of that object may be cached locally. Such an approach is described in METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. Making the assumption that it is common for only a single user to be using a network at any one time, that system employs the notion of "opportunistic" locks. The first client to request access to an object is given opportunistic (qualified) exclusive access to that object; a copy of the object may be cached locally in the client. If another client also requests access, the first client relinquishes its exclusive access, with the corresponding opportunistic exclusive lock held by the first client also being lifted. Upon removal of its exclusive lock, however, the client can no longer rely on its cached copy of the information—others may now post changes to that very same information.

The foregoing approach has distinct limitations which limits its usefulness. First, the assumption that only a single user is using a network at any one time is becoming increasingly difficult to make. Early on in their history, networks were simply an adjunct to PCs, largely for printer sharing. Their capacity largely went unutilized. Today, however, networks form the backbone of corporate computing, as more and more companies are moving their data off mainframes and onto networks. Therefore, a more valid assumption would be that many users are using a network at any one time; the contention for a particular data object may in fact be quite high. In the above-described system, therefore, it is quite likely that opportunistic locks would have to be frequently relinquished, thus making the technique largely ineffective (or even counter-productive). Second, the approach requires the server to know the status of each client's context and to act accordingly. This interdependency of each client with the server (e.g., for receiving a command to relinquish an exclusive lock) is not desirable in today's heterogenous network environments.

Instead, what is needed are system and methods which allow clients to optimize disk access by maximizing use of local buffers, all without the need for the server to monitor the status of each client. Optimization of disk access should not decrease the autonomy which has made client/server systems such an attractive model for solving corporate information processing needs. The present invention fulfills this and other needs.

SUMMARY OF THE INVENTION

The present invention includes a multi-user computer system having a server connected through a network to one or more workstations or "clients." This client/server system allows system resources and data objects, including information residing on a logical storage device, to be shared among several clients concurrently. In a preferred embodiment, the system of the present invention includes a multi-user database management system having shared information. The shared information includes data records stored in information tables residing on a storage device of the server.

The invention includes methods for providing concurrent access to shared data residing on the server, but without the network-communication overhead normally associated with transferring data to the clients. According to the present invention, data transfer operations are performed at a frequency matched to the ability of the client to make use of such information. Since information need only be updated (transferred to a client) about once every two seconds, resource-intensive data transfer operations may be minimized to only those which are really necessary. In all other instances (i.e., time periods when updating is not needed), data access is provided by a local copy of the data stored in a rapid-access memory of the client. By maintaining the data locally, with periodic refreshing, large data transfers to clients are avoided. At the same time, concurrency information (e.g., updates) is provided to clients as fast as it can be effectively assimilated.

In an exemplary embodiment (designed for preemptive or interrupt-based systems), a method for providing a client optimized access to data residing on a server proceeds as follows. First, a buffer is allocated in the memory of the client for storing a local copy of the desired information. Next, the system sets an "invalid" flag for indicating that information stored in the buffer is invalid; that is, the buffer (at this particular point in time) does not hold a valid copy of the desired information. The system then transfers the desired information from the server into the buffer and, in doing so, resets the flag to indicate that the buffer is now valid—a correct copy is stored. At a periodic time interval, one selected to optimize the data transfer characteristics of the network, the invalid flag is set again for marking the buffer as (possibly) invalid. When the information is required, if the system detects that the invalid flag has been tripped, the system transfers the desired information from the server into the buffer and resets the flag (to "valid").

With a copy of the information of interest locally cached, the client may proceed to operate on the copy residing in the rapid-access memory, instead of repeatedly re-reading (transferring) the desired information from the server. The desired information is only re-read from the server when the invalid flag is set.

GLOSSARY access (disk access): To obtain entry to, or to locate, read into memory, and make ready for some operation. Access is used with regard to disks, files, records, and network entry procedures.

allocate: To reserve memory for use by a program. Programs often need certain system resources such as memory or disk space, and they request them as needed from the operating system.

block (storage block): A group of similar things—usually bytes of storage or data. In disk storage, a block is a collection of consecutive bytes of data that are read from or written to the disk as a group.

database: An organized collection of information.

Database Management System (DBMS): System that controls the organization, storage, and retrieval of information in a database.

directory (and subdirectory): A way of organizing and grouping the files on a disk; typically, presented to the user as a catalog for filenames and other directories stored on a disk. What the user viewed as a directory is supported in the operating system by tables of data, stored on the disk, that contain characteristics associated with each file, as well as the location of the file on the disk.

field: A member of a row that holds a data value associated with an attribute.

file: A file is a conglomeration of instructions, numbers, words, or images stored as a coherent unit which may be operated upon as a unit (e.g., for retrieving, changing, deleting, saving and the like). A disk file is a basic unit of storage that enables a computer to distinguish one set of information from another; typically includes at least one complete collection of information, such as a program, a set of data used by a program, or the like.

file name: A file name is a name assigned for identifying a file.

header: Typically the first data in a file, a header stores identity, status, and other data of a file.

index: A stored collection of keys (see below) which facilitate record operations, including searching, inserting, and deleting. Such data structures can include hash tables, binary trees, and B-trees.

input/output: Often abbreviated I/O, input/output refers to the complementary tasks of gathering data for the microprocessor to work with and making the results available to the user through a device such as the display, disk drive, or printer.

location (storage location): The position at which a particular item can be found. A storage location can be an addressed (uniquely numbered) location in memory or it can be a uniquely identified location (sector) on disk.

read (disk read): Read is the operation of receiving input into the computer from a peripheral device, such as a disk. A read is an I/O operation: data is being output from the peripheral device and input into the computer.

referencing: Addressing or otherwise targeting a desired object (e.g., file) at a particular (addressable) location.

resource: Any part of a computer system or network, such as a disk drive, printer, or memory, that can be allotted to a program or a process while it is running.

row/record: Physically, a row is usually a record in a data file. Logically, a row is one horizontal member of a table: a collection of fields.

storage device: Any apparatus for recording information in permanent or semipermanent form. Most commonly refers to a disk drive.

table: A structure that contains information. Usually, a collection of rows all stored in one logical file.

write (disk write): To transfer information either to a storage device, such as a disk, or other output device. A disk write transfers information from memory to storage on disk.

DETAILED DESCRIPTION OF A PREFERRED EMBODIMENT

The following description will focus on embodiment of the present invention in a multi-user database environment. Application of the present invention is particularly advantageous in those environments requiring access to data in a shared fashion, such as in a multi-user or multi-tasking database system. The present invention is, however, not limited to any particular exemplary embodiment. Instead, the teachings of the present invention may be advantageously applied to a variety of architectures. Therefore, the following preferred embodiment and certain alternatives are offered for purposes of illustration and not limitation.

As used herein, the term "database" and "table" refers to any file or collection of files that are used to store information or other data. For example, a spreadsheet file can be considered a database using the present invention. In addition, a database can be a purely virtual object such as data on a remote machine.

General Architecture

Figure 1A:
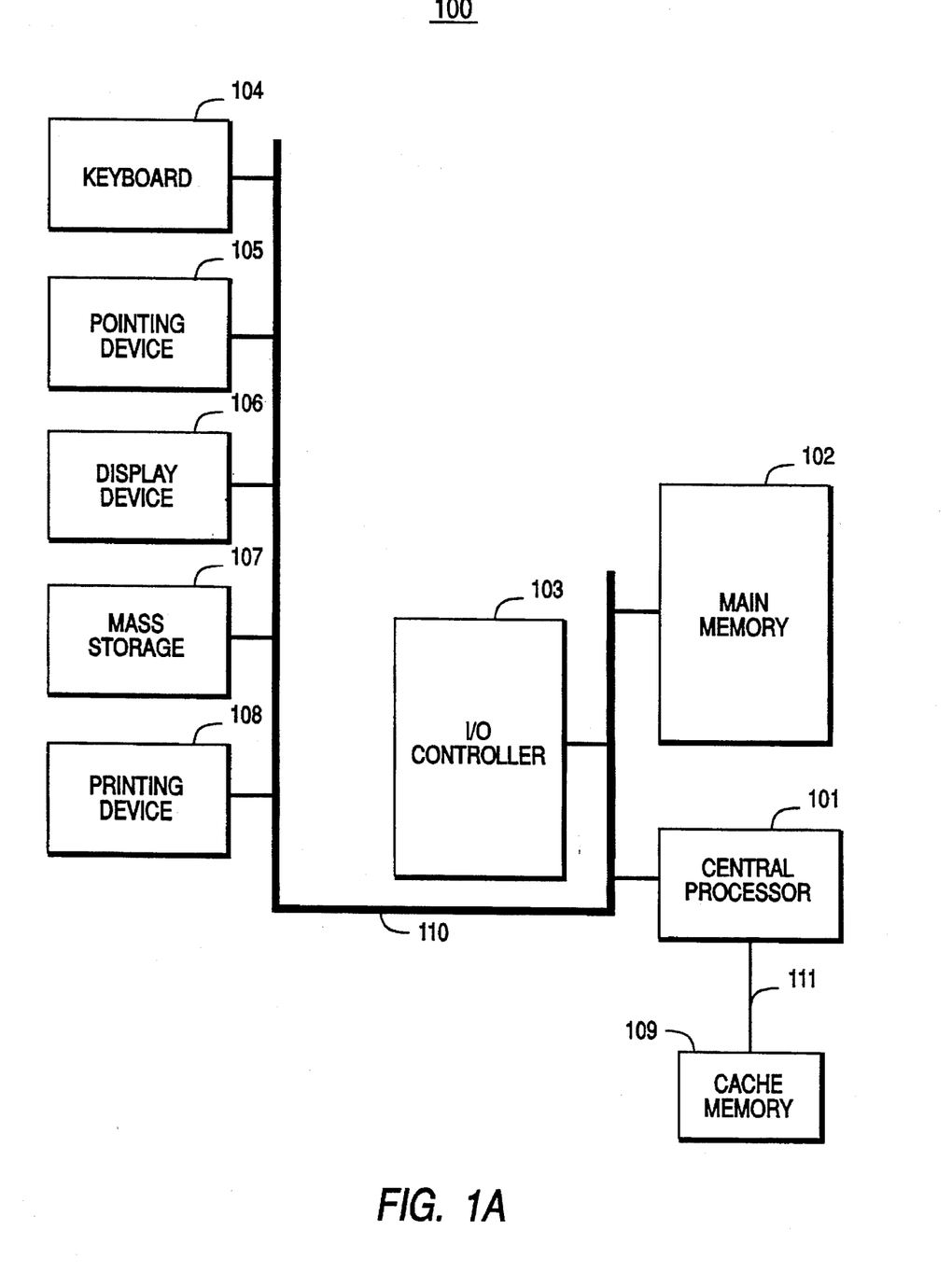
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a non-volatile or mass storage 107. Memory 102 includes volatile memory, such as random-access memory or RAM; storage 107 includes non-volatile memory, such as a hard or fixed disk, optical disk, magneto-optical disk, or flash memory. Processor 101, which may be an Intel® 80×86-class microprocessor, includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 1B:
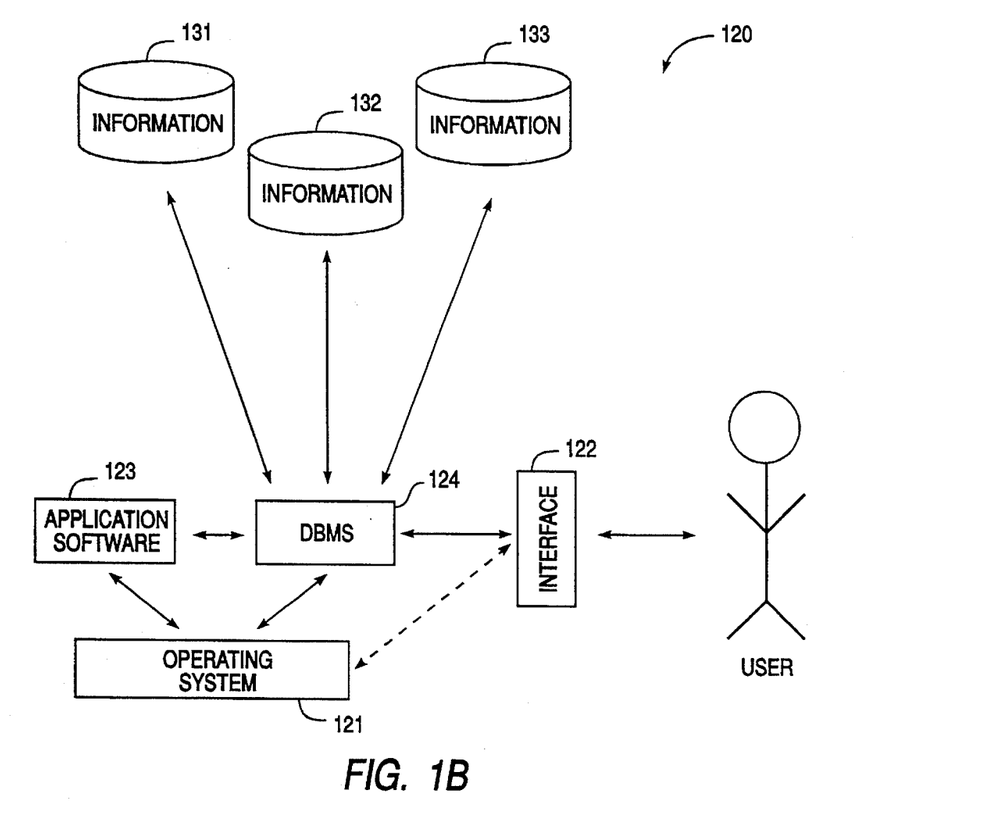
FIG. 1B is a block diagram of a software system, including a database management system (DBMS), which is operative in the computer system of FIG. 1A.

Illustrated in FIG. 1B, a computer software system 120 is provided for programming the operation of the computer system 100. Software system 120, which is stored in system memory 102 and on disk memory 107, includes a kernel or operating system 121 and a DBMS 124. OS 121 is the executive or supervisor for the system 100, directing both task management and data management.

DBMS 124, on the other hand, is a software subsystem for storing, retrieving, and manipulating information in database tables (e.g., tables 131, 132, 133). Under the command of DBMS 124, the system 100 receives user commands and data through user interface 122. Interface 122 may include a built-in query surface or editor for accessing and processing database information. Additional application programs, such as DBMS application software 123, may be "loaded" (i.e., transferred from storage 107 into memory 102) for execution by the system 100, particularly for further controlling the operation of DBMS 124.

In a preferred embodiment, the system 100 is an IBM-compatible personal computer system, available from a variety of vendors (including IBM of Armonk, N.Y.), and operating system 121 is MS-DOS operating system software, available from Microsoft of Redmond, Wash. DBMS 124 preferably includes dBASE IV® (available from Borland International of Scotts Valley, Calif.) which includes dBASE's Command Control and QBE query surface. If desired, other operating systems and/or DBMSs (or alternative configurations thereof) may be employed in accordance with the principles of the present invention. In the most preferred embodiment of the present invention, the system 120 operates in a shared environment, such as in a client/server configuration running in a Local Area Network (LAN) environment (described hereinbelow with reference to FIG. 1D).

Figure 1C:
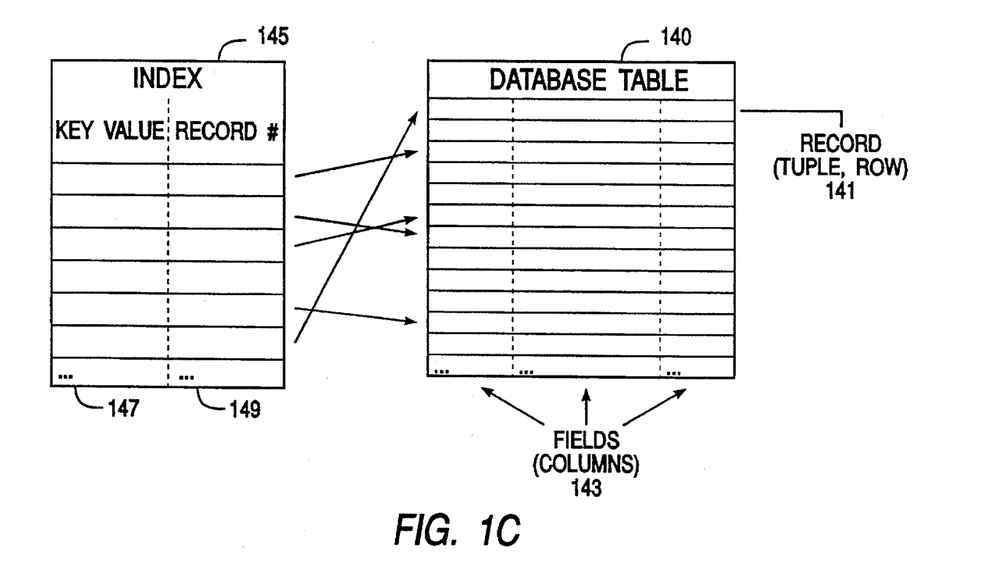
FIG. 1C is a block diagram illustrating a data object, such as database file; an object may have interrelated or dependent data, such as a supporting index.

At the outset, it is helpful to understand general techniques for storing information, such as in DBMS 124. In a database management system, information is conveniently organized into tables, such as table 140 of FIG. 1C. As conceptually shown, table 140 typically includes horizontal rows or records (tuples) 141 and vertical columns or fields 143. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

A given table may be interrelated to other data objects, including for example index, report, and form files. A database index allows the records of a table to be organized in many different ways, depending on a particular user's needs. As shown by index 145 of FIG. 1C, for example, an index may be constructed as a single disk file which is referred to internally by the system for locating and displaying records in a database file. Index 145 stores index key values 147 and unique record numbers 149. The former is a data quantity composed of one or more fields from a record used to arrange (logically) the database file records by some desired order (index expression); the latter are unique pointers to the actual storage location of each record in the database file.

Network Architecture

Figure 1D:
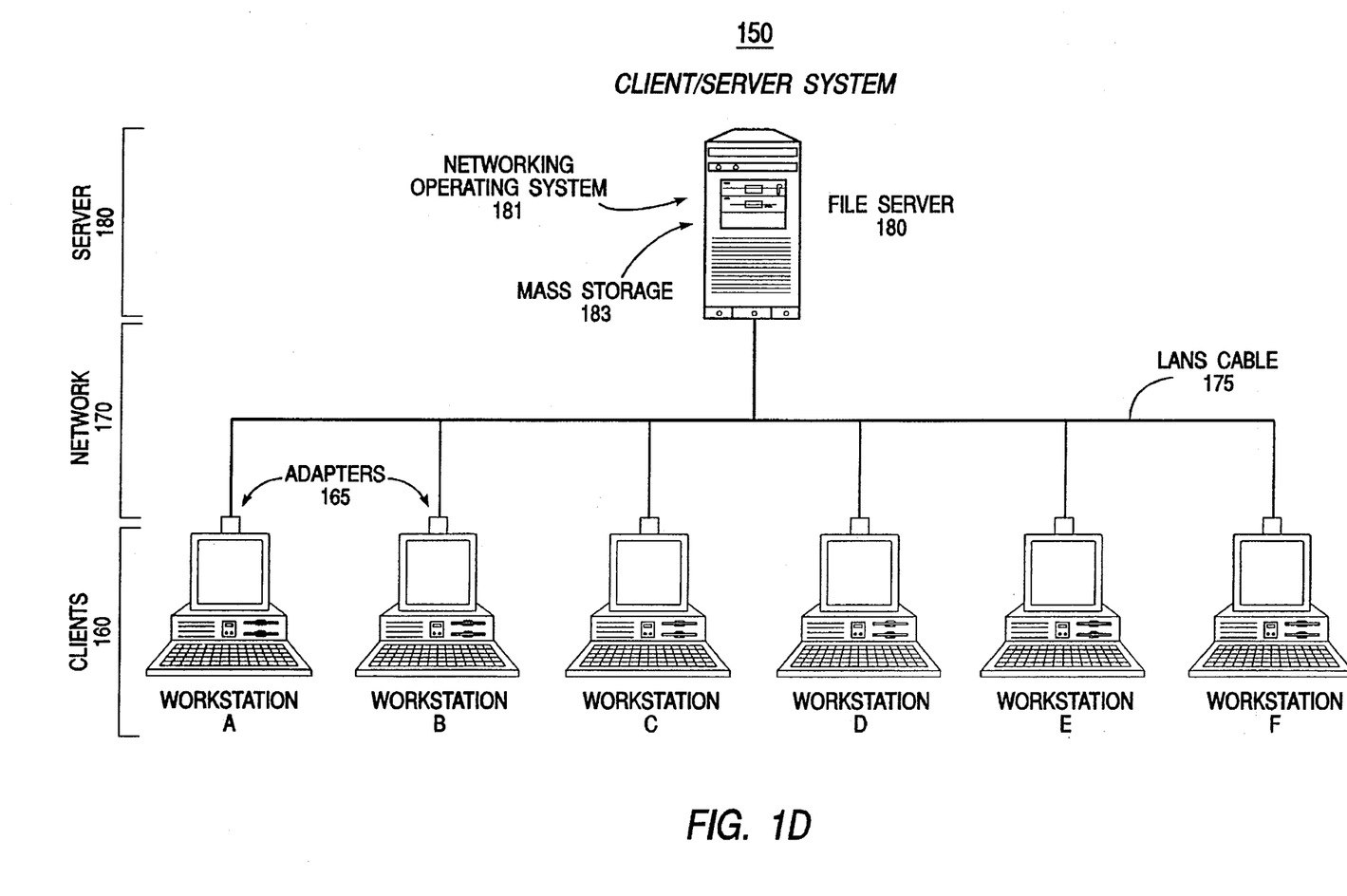
FIG. 1D is a block diagram of a multi-user computing environment, such as a client/server system connected via a Local Area Network (LAN), in which the present invention is most preferably embodied.

While the present invention may operate within a single (standalone) computer (e.g., system 100 of FIG. 1A), the present invention is preferably embodied in a multi-user computer system, such as the client/server system 150 of FIG. 1D which includes system 100. Specifically, system 150 includes a first computer or server 180 and one or more second computers or clients 160. In an exemplary embodiment, the clients or workstations 160 are connected to server 180 through a computer network 170, which may be a conventional Local Area Network (LAN). Network 170 includes cabling or network links 175 for connecting the server and each workstation to the network. The workstations themselves will be similar to or the same as system 100; additionally, each typically includes an adapter 165 for receiving the network cable 175. Server 180 may also be similar to or the same as system 100. Because the server manages multiple resources and objects for the clients, it should preferably include a relatively faster processor, larger mass storage, and more system memory than is found on each workstation.

Overall operation of the system 150 is directed by a networking operating system 181, which may be stored in the server's system memory; in a preferred embodiment, OS 181 includes NetWare®, available from Novell of Provo, Utah. In response to requests from the clients 160, the server 180 provides various network resources and services. For instance, multiple users (e.g., workstations A, B, and C) may view a database table stored in file server storage 183, while another user (e.g., workstation E) sends a document to a network printer (not shown).

The general construction and operation of a computer network has been well documented in the technical, trade, and patent literature. For a general introduction to a Local Area Network operating under NetWare, see Freed, L. et al., PC Magazine Guide to Using NetWare, Ziff-Davis Press, 1991. A more detailed discussion is available in NetWare and accompanying documentation, which is available from Novell of Provo, Utah. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. The disclosures of each of the foregoing is hereby incorporated by reference.

Multi-User Database Operation

Of particular interest to the present invention is use of system 150 for multi-user database access which will now be described. To an end user, using the DBMS of the present invention in a networking environment is much like using it as a standalone program on a single computer (e.g., system 100). On a network, however, resources and data objects may be shared with other users, with two or more users often working with the same resource or object simultaneously. Not unexpectedly, a given network's rules for file-sharing (i.e., trustee assignments of directories and files) come into play. For instance, a user cannot change a table if he or she does not have sufficient network rights to the directory the table resides in. Despite these restrictions, network operations remain, for the most part, transparent to an end user.

According to the present invention, database objects (e.g., tables, forms, reports, and the like) are locked by system 150 when necessary to ensure data integrity and consistency. Locks temporarily restrict other users from accessing an object while the user (lock holder) is using it. Typically, these sharable objects will be stored in at least one shared directory (e.g., on storage 183).

The system of the present invention provides for both automatic and explicit placement of locks. For instance, each record is automatically locked when a user begins to edit it and unlocked when the user leaves the record. Alternatively, each user (typically, a developer-user) can explicitly lock an object, thus allowing one to maintain complete control over the access of others to tables he or she is sharing.

Methods for Optimized Data Access

A. Preemptive (interrupt-based) embodiment

Figure 2A:
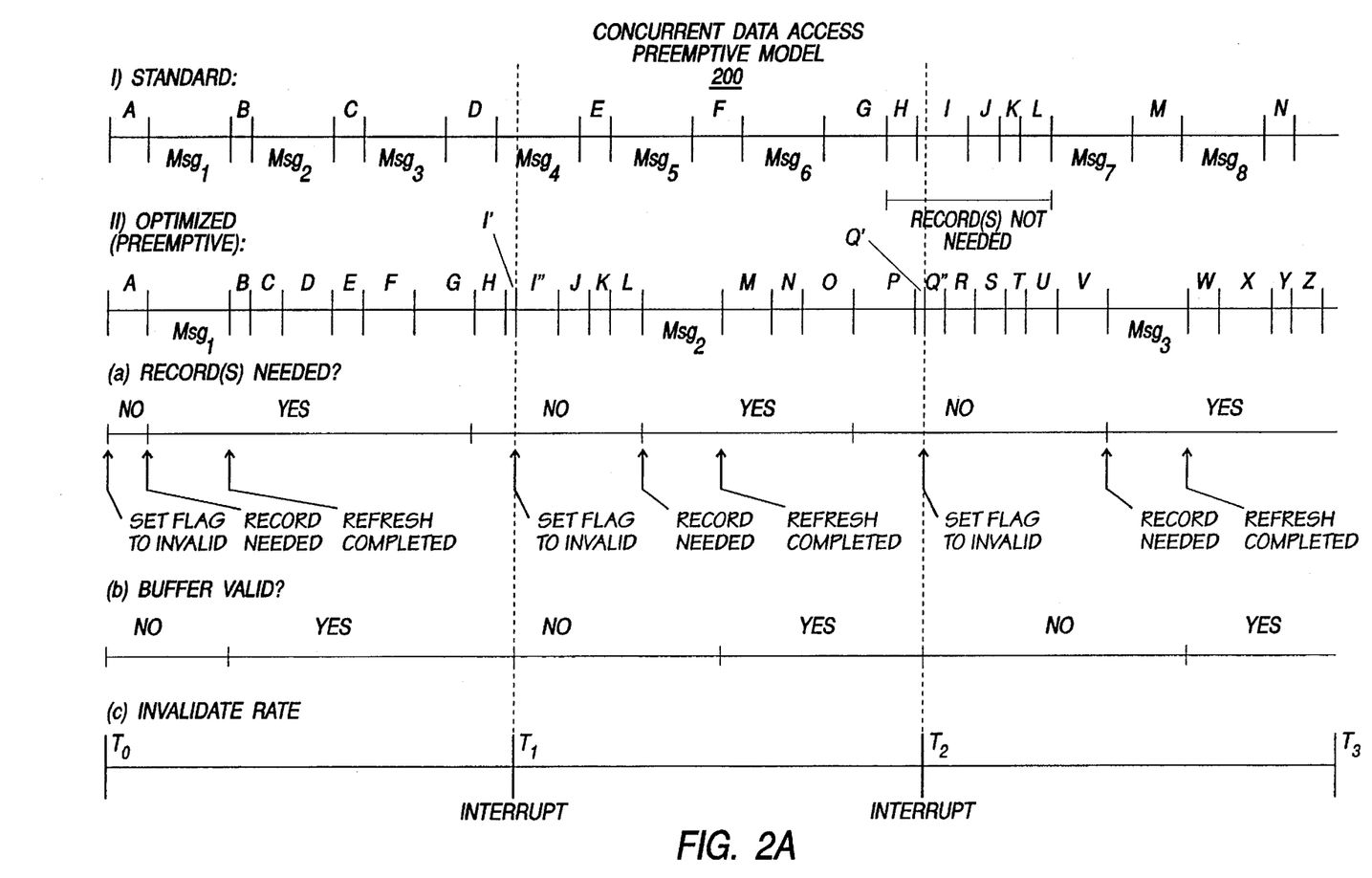
FIG. 2A is a timing diagram illustrating an optimized data access method of the present invention, operative in a preemptive (interrupt-based) model.
Figure 2B:
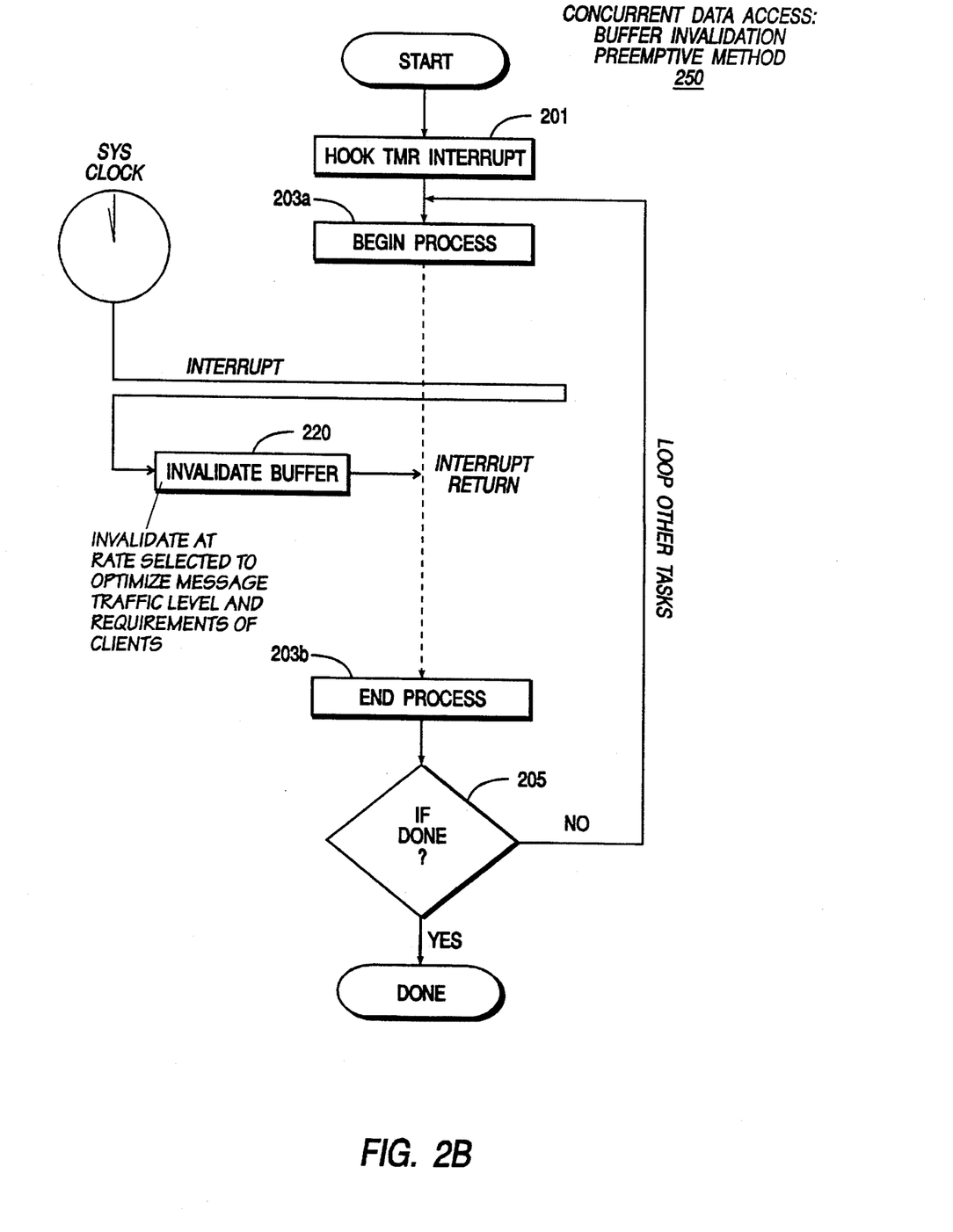
FIG. 2B is a flowchart illustrating the general operation of the optimized data access method (of FIG. 2A).
Figure 2C:
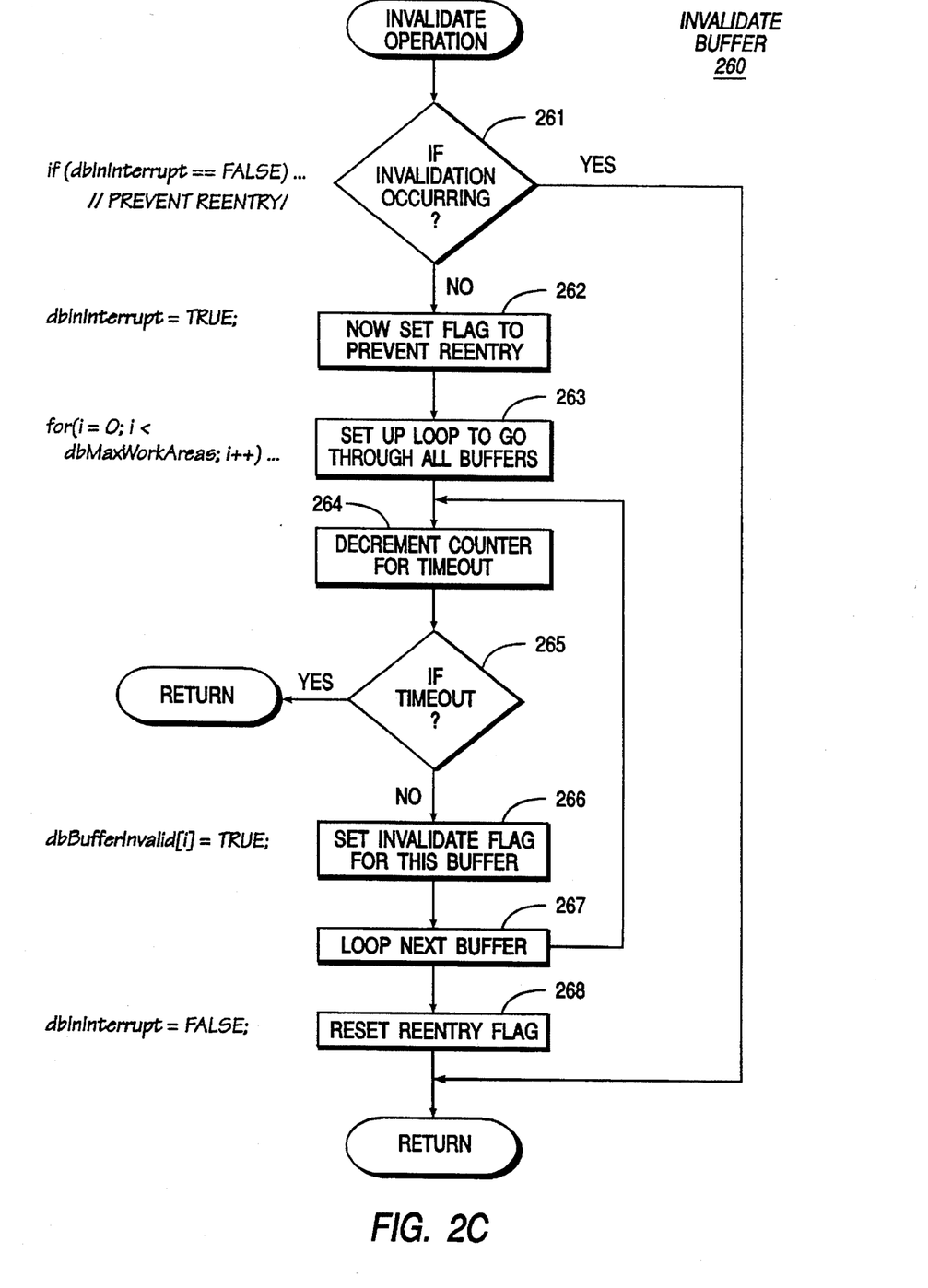
FIG. 2C is a flowchart illustrating steps of refreshing a local memory buffer which occur during the optimized data access method (of FIG. 2B).

Referring now to FIGS. 2A–C, a method of the present invention for optimized multi-user access will be described. At the outset, it is helpful to review conventional methodology for data access in a computer network environment, as shown by tracing I of FIG. 2A. From that foundation, the teachings of the present invention may be better understood.

Tracing I represents a series of processes or tasks executed by the processor 101 over a finite period of time. In operation, processor 101 receives a sequence of instructions (i.e., "machine instructions") encoded in the form of a sequence of bytes from one or more logically defined areas (code segments) of the memory 102. In typical data processing operation, a specific sequence of instructions are provided to accomplish a given task. These are represented in tracing I by the uppercase letters (e.g., A–N). These tasks, which are being performed by the processor 101, may be any one of the numerous applications which lends itself to modeling on a digital computer. Examples include such diverse applications as word processing, a database "join" operation, a spreadsheet recalculation operation, and so forth. As each task is comprised of a plurality of machine instructions and each machine instruction, in turn, requires one or more system clock cycles within which to operate, each defined task requires an interval of time or "time slice" within which to complete.

Machine instructions or simply "code" usually operate on data objects or structures. A series of instructions for sorting a database table, for instance, would require access to the data structures which represent the table, namely the individual records which comprise the table. And these data may be quite numerous and/or large. Customer information for a medium-sized company, for instance, can easily require megabytes of storage space. To process data (e.g., database records) which are required by a given task, a mechanism must be provided for giving the processor access to the data.

As shown in tracing I, interjected between those times which the processor is performing a particular task are intervals of time required for data access operations. As is well known in the art, the time required for accessing a data object of interest varies widely. On the one hand, data present in a register of the processor may be quickly accessed, on the order of nanoseconds. On the other hand, data which must be read from a disk storage device has a much slower access time; twenty milliseconds is typical. More problematic is data resident on a server operating in a computer network. As several users (clients) may be simultaneously employing the services of the network, data access may be particularly slow.

Represented by $Msg_n$ time intervals, data access across a computer network occupies a significant if not substantial portion of a processor's time (which must wait for the required data item to arrive). For file intensive applications, such as sequentially processing records of a database table, a good portion of a processor's time will be spent waiting for data to arrive. The phenomenon of "network bottleneck" is a well known one.

Standard methodology for accessing data objects is not only resource intensive but is also wasteful. In particular, network resources are wasted updating or reading information records at a rate which exceeds the usefulness of such updates to the clients. In tracing I, for instance, three read operations ($Msg_1$–$Msg_3$) are performed in a time period ($T_0$–$T_1$) which exceeds the usefulness of such information to the client. In other words, effort has been expended updating the local buffer of the client at a rate which exceeds the ability of the client to process such updates.

With reference to tracing II, a preferred method of the present invention for optimized data access in the computer network 150 will now be described. Since the local buffer need only be updated at a rate no greater than needed for processing, the slow task of retrieving information across a network may be minimized to only those instances which are really necessary. As shown by tracing II, the local buffer is updated a maximum of only once per a predefined frame-rate time interval. In the time interval from $T_0$ to $T_3$, for instance, only three buffer refresh operations are needed: $Msg_1$–$Msg_3$. Additional refreshing of the buffer is not necessary and is in fact wasteful of system resources.

As shown in the first time interval ($T_0$–$T_1$) of tracing II, a buffer refresh operation is only performed a maximum of once ($Msg_1$) during the interval. At all other times during the interval, the various system processes which may be executing (e.g., tasks A–I) access the copy of the data stored in the local buffer which is maintained in an allocated section of memory 102 (or in dedicated cache memory 109). Data accesses to the local memory execute substantially faster than ones to data residing on the file server; further cache optimization may be added as desired. By maintaining a local buffer in rapid access memory, the penalty incurred with large data transfers across a network is avoided. By periodically refreshing the buffer, concurrency is maintained.

In operation, the local buffer is "invalidated," at the preselected time interval. Specifically at this point, a flag is set for indicating that the contents stored in the buffer can no longer be assumed to be valid. The preselected time interval may be empirically selected to match the data transfer characteristics of the network with the data processing capabilities of the clients. The buffer is not refreshed during those time intervals when access to data is not required by a currently-executing process. In other words, an invalid buffer is next refreshed (data re-read) when only a process requests access to the data in the buffer.

As shown, the optimized data access method of FIG. 2A is preemptive or interrupt-based in nature. Specifically, at predefined time intervals, system processes are interrupted so that the buffer may be invalidated. An "interrupt" is a special type of instruction which causes the processor 101 to halt the execution of the current program, save the current state of the system on stack memory (maintained in memory 102), and jump to an appropriate interrupt-handling routine (specified by the number of the interrupt). After the interrupt routine has finished, it performs an "interrupt return" which causes the previously executing program to resume.

Two basic types of interrupts exist: those generated by hardware and those caused by software. A hardware interrupt is typically generated by some system element outside the control of the executing program. Examples include a key press, a character arriving at a serial port, a tick of the system clock, and the like. A software interrupt, on the other hand, is generated on purpose by the running program. Intel 80×86 CPUs (e.g., CPU 101) allow a program to execute a software interrupt via the INT machine instruction. The number that follows the instruction determines the number of the interrupt and serves as an index into an interrupt vector table whereby the appropriate interrupt handler (routine) may be invoked. The great majority of software interrupts employ INT 21h, which is the gateway to MS-DOS services, and INT 10h for ROM BIOS video services.

Of particular interest to the present invention are periodic hardware interrupts. AT-compatible computers, for instance, include a Motorola MC146818 real-time clock (RTC) chip (or functional equivalent) which provides the system with a real-time clock. The RTC chip includes the added capability of generating a periodic hardware interrupt at a program-specified frequency or time, which can be programmed to occur at frequencies ranging from 2 hertz to 8.192 kilohertz. By setting various status bits in the chip, for instance, the following periodic interrupt rates may be obtained:

TABLE 1

| RS Bits | | | | | |
|---|---|---|---|---|---|
| 3 | 2 | 1 | 0 | Periodic Rate | Ticks/Second |
| 0 | 0 | 0 | 0 | None | None |
| 0 | 0 | 0 | 1 | 3.90625 ms | 256 |
| 0 | 0 | 1 | 0 | 7.8125 ms | 128 |
| 0 | 0 | 1 | 1 | 122.070 μs | 8,192 |
| 0 | 1 | 0 | 0 | 244.141 μs | 4,096 |
| 0 | 1 | 0 | 1 | 488.281 μs | 2,048 |
| 0 | 1 | 1 | 0 | 976.562 μs | 1,024 (default) |
| 0 | 1 | 1 | 1 | 1.93125 ms | 512 |
| 1 | 0 | 0 | 0 | 3.90625 ms | 256 |
| 1 | 0 | 0 | 1 | 7.8125 ms | 128 |
| 1 | 0 | 1 | 0 | 15.625 ms | 64 |
| 1 | 0 | 1 | 1 | 31.25 ms | 32 |
| 1 | 1 | 0 | 0 | 62.50 ms | 16 |
| 1 | 1 | 0 | 1 | 125 ms | 8 |
| 1 | 1 | 1 | 0 | 250 ms | 4 |
| 1 | 1 | 1 | 1 | 500 ms | 2 |

To the timer interrupt, one may attach an interrupt service routine (ISR) for "servicing" (performing a desired task) in response to occurrence of the interrupt. In this fashion, a periodic interrupt may be generated at a rate selected to correspond with a desired frame rate. The use of system clocks for generating time-based interrupts is well documented in the technical, trade, and patent literature. See e.g., Mischel, J., The AT Real-Time Clock, PC Techniques, June/July, 1992, pp. 25–36, the disclosure of which is hereby incorporated by reference. Referring now to FIG. 2B, the method of the present invention for providing optimized concurrent data access in a preemptive (interrupt-based) system is summarized by a flowchart 250. The steps are as follows. First, in step 201, a periodic timer is established, for example, by hooking into an available timer interrupt. The specific procedure for accomplishing this will vary from one hardware platform to another; those skilled in the art, however, will appreciate the functional equivalent of this step for their target system. One should select an interval sufficiently short in duration to achieve a frame rate at or above the above-mentioned read (message) rate, typically on the order of about 1–4 seconds per frame. For particular applications, slower rates may still give acceptable results.

After the interrupt interval is established, the system may proceed to perform one or more operations of interest. Step 203 represents (conceptually) the performance of a particular task or process by the system (e.g., modifying fields of a database record). As shown, the process is interrupted at the preset interval, whereupon a buffer invalidate operation, step 220, is performed. The process can be any sequence of processor instructions. There is no requirement that the task itself be time-based (in contrast to, say, real-time multimedia processes). The only requirement is that the process is one capable of being interrupted in response to occurrence of the interrupt which has been enabled in step 201. Of course to benefit from the method of the present invention, at least some data access should be contemplated by at least one of the processes to be performed.

Once the interrupt service step 220 concludes (interrupt return), control is returned to the executing process of step 203. Step 205 (although shown conceptually as a loop) simply indicates that other processes of the program are undertaken in a similar fashion (i.e., normal operation with periodic strobes of image memory to video memory). Upon completion of all processes (yes at step 205), the method concludes (and typically returns control to the operating system).

Referring now to FIG. 2C, a method 260 of invalidating a buffer in accordance with the present invention is illustrated by a flowchart. The steps are as follows. At step 261, the method determines if an invalidate operation is already occurring. Since the time-based interrupt occurs at defined intervals, it is preferable to include step 261 to prevent unnecessary reentry. Thus, if an invalidation is already occurring (yes at step 261), then the method 260 simply returns (for this particular invocation). Otherwise (no at step 261), the method proceeds to step 262 to now set the invalidation reentry flag to true. At step 263, a loop is established to process each of the one or more buffers that may be active.

The method includes a "timeout"—an upper time limit which will be spent performing the steps of the method. Thus, at step 264, a counter is decremented for keeping track of the time which has been spent within the method. At step 265, the counter is examined to make sure time remains. If a timeout occurs (i.e., count equal to 0), the method concludes. If a timeout has not occurred, however, the method proceeds to step 266 to set an invalidate flag for the buffer (i.e., the current buffer being processed in this loop) to "invalid." At step 267, the method loops back to step 264 for any remaining buffers. After all buffers have been invalidated (or a timeout has occurred), the method proceeds to step 268 to reset the reentry flag (i.e., to false); after this step, the method concludes.

In an exemplary embodiment, a suitable buffer routine may be constructed as follows (in C language):

```
// . . .
//
// Following is the clock interrupt routine that
// is executed every 1/18th of a second
//
void _far interrupt RealNewClock()
{
    ++clockTickCounter;         // Increment 1/18 of a second
    IoUpdateScreen();           // Screen refresh
    //
    // Check if network access and if 1 second has passed
    // ( 18 ticks ) and not in this loop (prevent reentry).
    //
    if (runIsMultiUser && (clockTickCounter % 18) == 0 &&
        !dbInInterrupt) {
        register int i;         // counter variable used for loop
        dbInInterrupt = TRUE;   // prevent re-entry
        //
        // Loop thru all table buffers
        // Decrement time counters.
        //
        for(i = 0; 1 < dbMaxWorkAreas; i++) {
            if (dbBufferTimeLeft[i] > 0) {
                dbBufferTimeLeft[i]--;   // decrement by 1 second
            }
            else if (dbBufferTimeLeft[i] == 0) {   // time out check
                //
                // A table buffer time counter has decremented
                // to zero.
                // Set flag to indicate that this table's buffers
                // are invalid and need to be re-read.
                //
                dbBufferInvalid[i] = TRUE;
            }
        }
        dbInInterrupt = FALSE;  // finished
    }
}
// . . .
```

Figure 2D:
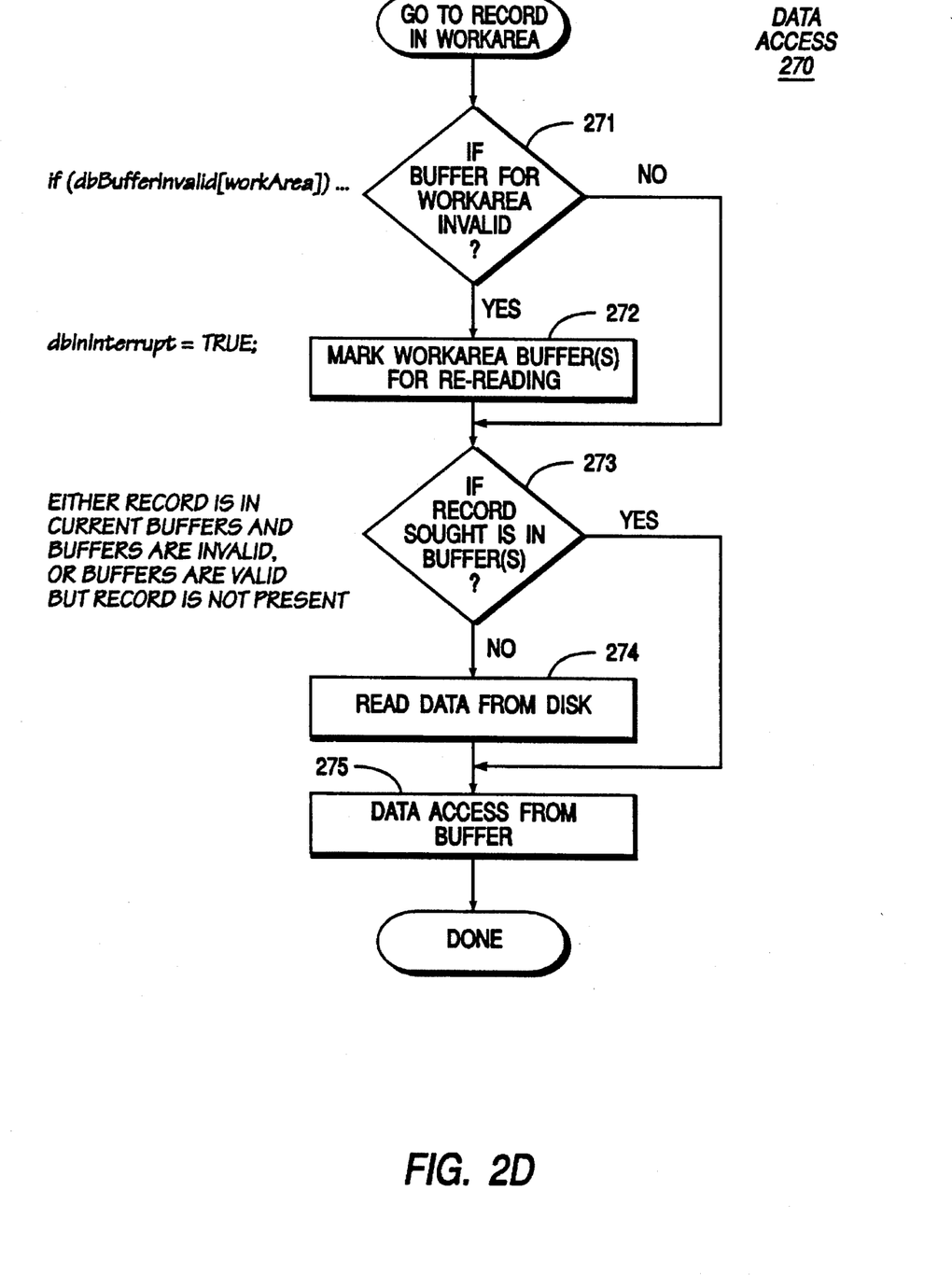
FIG. 2D is a flowchart illustrating steps of data access of a record from a workarea buffer.

Referring now to FIG. 2D, an exemplary method 270 of the present invention for data access is illustrated. In this example, the data access required is to "go to" or access a particular data record of interest. In dBASE® programming language, for instance, a user or process may issue a command of GOTO 5, for instructing the system to access the fifth record of a table. The method is invoked with a record number of the record of interest and a handle to the workarea (i.e., database table) from which the record is sought.

The method proceeds as follows. At step 271, if the buffer for the record sought (i.e., the buffer for the workarea of the record) has been invalidated, then the method marks the workarea buffer for re-reading at step 272. Otherwise (no at step 271), step 272 is skipped. At step 273, a determination is made as to whether the record is present in the buffer. A record may not be present in the buffer because: (1) the buffer is invalid or (2) the buffer is valid but this particular record has not been read into the buffer. In either case, if the record is not present (yes at step 273), the method proceeds to step 274 to read the record (or records) from storage disk (on the server). If the record is already in the buffer (yes at step 273), however, step 274 may be skipped. Finally, the method may now proceed to access the record from the buffer at step 275.

Again using the C language, a method for providing access to a particular record of interest may be constructed as follows:

```
// ...
//
// This is a record access routine that
// positions to a specific record in a table buffer
// This occurs when user does any table movement ( e.g., Skipping,
Search )
//
void DbGoRec (workArea, recordNumber)
int workArea;
long recordNumber;
{
    if (dbBufferInvalid[workArea]) {        // are buffers invalid?
        DbMarkBuffersForReReading(workArea);    // yes, so
                                                // mark all
                                                // buffers
    }
    if (IsRecordInBuffers(workArea,recordNumber)) {
        //
        // Record desired is in current buffer,
        // but current buffer is invalid, so we must re-read.
        //
        // or,
        //
        // Buffers are still valid but record desired is not in
        // current buffers, so must read in buffer from disk.
        //
        DbReadBlock(workArea,recordNumber);     // read from
                                                // disk
        //
        // Reset time counter.
        //
        dbBufferTimeLeft[workArea] = dbBufferTimeOut;
    }
}
// ...
```

Using the foregoing system and methods of the present invention, the following comparative data access benchmarks have been observed for a PC-based system.

TABLE 2

| Data access operation | Standard | Optimized |
| --- | --- | --- |
| skip 100,000 records | 4:33 (min:sec) | 55 (sec) |
| skip 20,000 indexed records | 2:37 (min:sec) | 22 (sec) |

B. Non-preemptive embodiment

Figure 3:
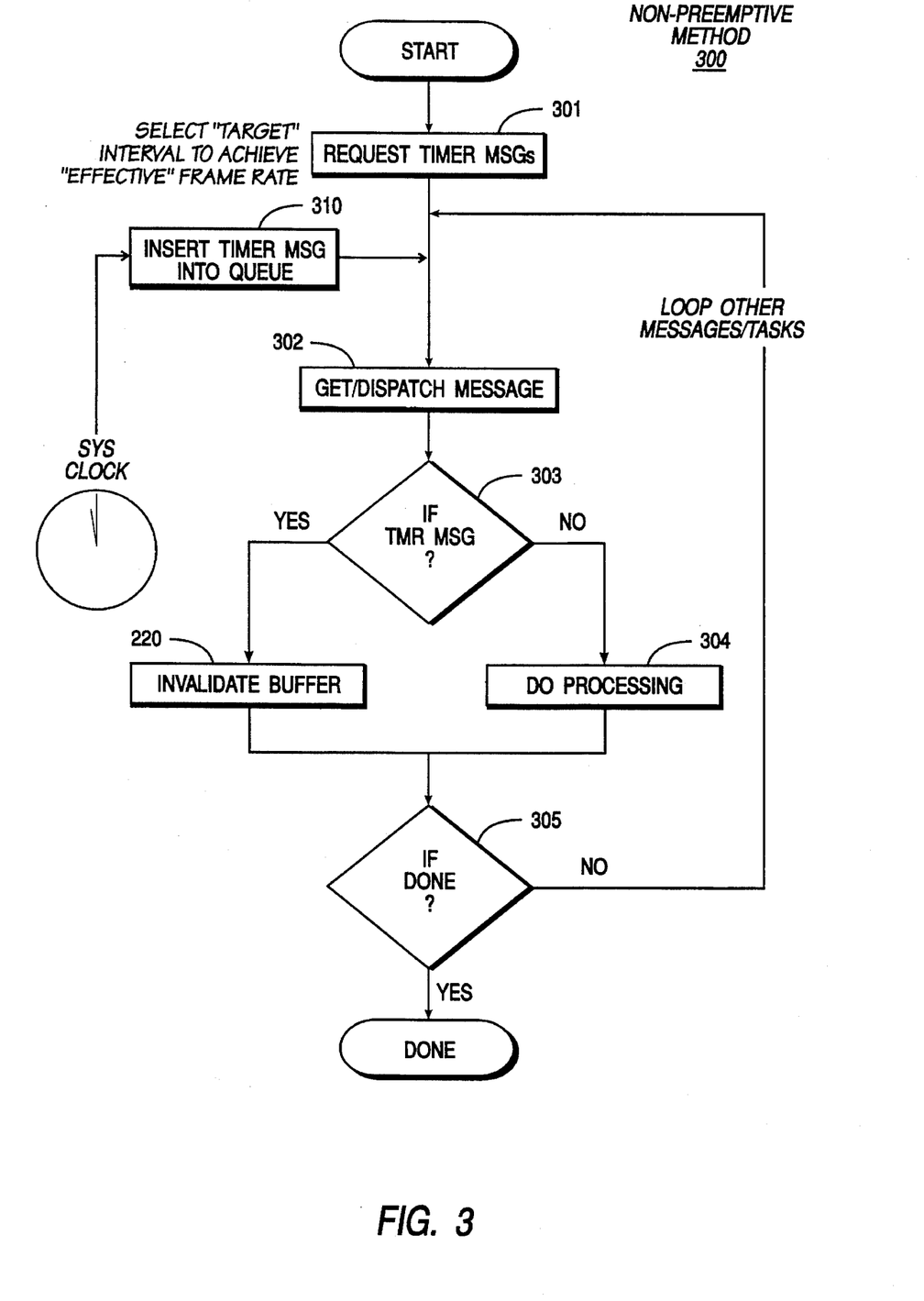
FIG. 3 is a flowchart illustrating steps of refreshing a local memory buffer which occur during a data access method of the present invention operative in a non-preemptive embodiment.

Referring now to FIG. 3, an alternative method of the present invention for optimized data access will be described. In those systems where a periodic interrupt (or functional equivalent) is not readily available, such as Microsoft Windows 3.0, a non-preemptive method for optimized data access may be employed. As is common in those systems, timing intervals are still available; however, they may not be available on a preemptive (interrupt) basis. In Microsoft Windows, for instance, timing messages are queued, thus complicating the design of real-time processes.

According to the present invention, there is no requirement that the buffer update operations occur at a precise interval. Instead, one need only achieve an "effective frame rate," that is, a rate which meets or exceeds the processing needs of the client. Thus, the actual time interval between any two buffer invalidation operations may vary. Ideally, however, one would select a target interval sufficiently small to compensate for any latency between occurrence of an interval (actual) and receipt of a non-preemptive timer message (apparent). In this fashion, a target time interval may be selected to achieve an effective frame rate which meets or exceeds the needs of the client.

As shown in FIG. 3, the method of this alternative embodiment is summarized by a flowchart 300. In step 301, timer messages are requested from the operating system (e.g., Microsoft Windows), with a target interval selected to achieve an effective frame rate meeting or exceeding the client's processing needs. Next, as illustrated by the flowchart, the message-based, event handling loop of the non-preemptive system is entered. As shown by step 310, appropriate timer messages are placed by the system in the queue of the process, as appropriate. At step 302, any message dispatched to the queue of the process is retrieved and processed. If the specified timer message is retrieved at step 303, the method may undertake the invalidate operation as previously described for step 220. Otherwise (no at step 303), the method does routine event-driven processing, as shown by step 304. As shown conceptually at step 305, the event loop is maintained until a "done" or "quit" message (e.g., Windows' WM_QUIT) is received.

Other techniques for accommodating the non-preemptive nature of Windows-type timers are described in the technical literature. See e.g., Petzold, C., Programming Windows, Second Edition, Microsoft Press, 1990 (Chapter 5: The Timer), the disclosure of which is hereby incorporated by reference.

While the invention is described in some detail with specific reference to a single preferred embodiment and certain alternatives, there is no intent to limit the invention to that particular embodiment or those specific alternatives. For instance, the system 100 may be implemented in other platforms, including Macintosh, Unix, and the like. While the present invention is perhaps best implemented in multi-user systems, those skilled in the art will also appreciate that the present invention may be employed in certain multi-tasking systems as well. Although the system of the present invention requires no dedicated hardware, the described methods may be implemented with a firmware coupled to the system, if desired; moreover, buffer memory may be implemented as a dedicated high-speed memory (e.g., SRAM) located physically separate from the system memory. Thus, the true scope of the present invention is not limited to any one of the foregoing exemplary embodiments but is instead defined by the following claims.

What is claimed is:

1. In a system comprising a computer network having at least one workstation (client) with a processor and a memory, and said computer network including a server for storing information which may be shared by said at least one workstation, a method for providing access to information stored on said server, said method comprising:

(a) said at least one workstation allocating a buffer in said memory for storing information of interest;

(b) said at least one workstation setting a flag for indicating that information stored in said buffer is invalid;

(c) at a preselected time interval, repeating step (b) for invalidating said buffer by setting said flag, wherein said flag indicates that information in said buffer is invalid at each preselected time interval;

(d) receiving a request for access to said information of interest;

(e) if said flag is set, said computer network transferring information of interest from said server into said memory of said at least one workstation before accessing said information of interest from said buffer; and (f) said at least one workstation resetting said flag for indicating that information stored in said buffer is valid.

2. The method of claim 1, further comprising:

repeating steps (d)–(f) for a plurality of different requests for information, wherein each request is satisfied by said buffer if said flag is reset.

3. The method of claim 1, wherein said time interval is selected to be sufficiently small so that step (b) is performed at a rate no greater than necessary for processing said information by said at least one workstation.

4. The method of claim 3, wherein said time interval is substantially equal to about 2 seconds.

5. The method of claim 1, wherein said information of interest includes database records stored on said server.

6. The method of claim 1, wherein in step (b) said buffer is only updated if a copy of said information stored in said buffer is not identical to said information stored on said server.

7. The method of claim 1, wherein in step (c) includes the substeps:

setting a system interrupt to occur at a preselected time interval; and upon occurrence of said interrupt, setting a flag for indicating that information stored in said buffer is invalid.

8. The method of claim 1, wherein in step (c) includes the substeps:

generating a system timer message at a preselected time interval; and upon receipt of said message, setting a flag for indicating that information stored in said buffer is invalid, wherein said time interval is adjusted to compensate for any differences between generation of said system timer message (actual time) and receipt of said system timer message (apparent time).

9. A server-base networking system with improved data access comprising:

a server having a storage device;

at least one client operably coupled to said server through a communication line, each said at least one client having a processor and a memory;

time-based means for setting a flag to indicate a copy of data in said memory of said at least one client as invalid at a periodic time interval, said copy of data being from said storage device of said server and indicated as invalid by said flag at each periodic time interval; and means, responsive to a request for data marked as invalid, for transferring a valid copy of data from said storage device of said server to said memory of said at least one client.

10. The system of claim 9, wherein said processor is an Intel® 80×86 class microprocessor and wherein said time-based means includes a real-time clock (RTC) capable of generating preemptive interrupts.

11. The system of claim 9, wherein said time interval is empirically selected to optimized data access.

12. The system of claim 9, wherein said time interval is selected from a range of about 1 to 4 seconds.

13. The system of claim 9, wherein said time interval substantially equals about 2 seconds.

14. In a data processing system having first and second storage means, said second storage means storing data and having a slower data access time than that of said first storage means, a method for concurrently accessing data, the method comprising:

(a) said system transferring a copy of said data from said second storage means to said first storage means, wherein a valid copy of said data is maintained in said first storage means;

(b) after a time interval, said system resetting a flag to indicate said copy as invalid, wherein said flag indicates said copy is invalid at each time interval;

(c) said system receiving a request for access to said data; and (d) said system repeating step (a) if said copy is marked as invalid.

15. The method of claim 14, wherein said flag is set when a copy of said data is transferred to said first storage means and reset at said time interval.

16. The method of claim 14, further comprising:

only transferring a new copy to said first storage means when said data resident on said second storage means has been modified.

17. The method of claim 14, wherein said data includes at least one database record.

18. The method of claim 14, wherein said time interval is about 1 to 4 seconds.

19. The method of claim 14, wherein said time interval is about 2 seconds.

20. An information storage and retrieval system comprising:

first storage means including a volatile memory;

second storage means including a non-volatile memory for storing data objects;

means for setting a status flag to indicate a copy of a data object resident in said first storage means at a preselected time interval, said flag indicating said copy is invalid at each preselected time interval; and means, responsive to a request for access to said data object, for transferring a new copy of said data object from said second storage means to said first storage means when said copy is invalid.

21. The system of claim 20, wherein said first storage means includes a random-access memory (RAM).

22. The system of claim 20, wherein said second storage means includes a storage disk.

23. The system of claim 20, further comprising:

real-time clock means for generating a signal at said preselected time interval, said setting means being responsive to said signal.

\* \* \* \* \*